(12) United States Patent
Van Drie

(10) Patent No.: US 8,486,506 B2
(45) Date of Patent: Jul. 16, 2013

(54) PROTECTIVE FILM

(76) Inventor: Carol J. Van Drie, Lansing, MI (US)

( * ) Notice: Subject to any disclaimer, the term of this patent is extended or adjusted under 35 U.S.C. 154(b) by 32 days.

(21) Appl. No.: 13/081,075

(22) Filed: Apr. 6, 2011

(65) Prior Publication Data

US 2011/0274871 A1 Nov. 10, 2011

Related U.S. Application Data

(60) Provisional application No. 61/321,274, filed on Apr. 6, 2010.

(51) Int. Cl.
*B32B 3/06* (2006.01)
*B32B 7/04* (2006.01)

(52) U.S. Cl.
USPC .............................................. 428/99; 428/98

(58) Field of Classification Search
USPC ...................................................... 428/99, 98
See application file for complete search history.

(56) References Cited

U.S. PATENT DOCUMENTS

| | | |
|---|---|---|
| 5,096,317 A | 3/1992 | Phillippe |
| 5,934,813 A | 8/1999 | Nyako et al. |
| 7,105,715 B2 | 9/2006 | Carlucci et al. |
| 2003/0002909 A1 | 1/2003 | Jeffries et al. |
| 2003/0125654 A1* | 7/2003 | Malik ............................... 602/48 |

* cited by examiner

*Primary Examiner* — Brent O'Hern
(74) *Attorney, Agent, or Firm* — King & Partners, PLC

(57) ABSTRACT

A protective film including at least one surface which serves as a protective barrier that releaseably covers at least a portion of an object.

3 Claims, 4 Drawing Sheets

PROTECTIVE FILM

CROSS-REFERENCE TO RELATED APPLICATION(S)

This application claims the benefit of U.S. Provisional Application Ser. No. 61/321,274, filed Apr. 6, 2010, entitled "Protective Film," which is hereby incorporated herein by reference in its entirety, including all references cited therein.

BACKGROUND OF THE INVENTION

1. Field of the Invention

The present invention relates in general to protective films and, more particularly, but not by way of limitation, to protective films for releaseably covering at least a portion of an object.

2. Background Art

Protective coverings for objects such as keyboards and display devices have been known in the art for years, and are the subject of numerous patents, including: U.S. Pat. No. 5,096,317 entitled "Computer Key Cover Apparatus," U.S. Pat. No. 5,934,813 entitled "Keyboard Protector Having Peaked Configuration," and United States Patent Application Publication Number 2003/0002909 entitled "Protective Keyboard Cover"—all of which are hereby incorporated herein by reference in their entirety including the references cited therein.

U.S. Pat. No. 5,096,317 appears to disclose a cover apparatus including a transparent housing overlying a computer keyboard, wherein the cover apparatus includes a plurality of forward and rear side walls defining rows of openings, wherein each row of openings is arranged overlying rows of computer keys. The openings are provided with cover housings to selectively cover individual or the plurality of keys, wherein each of the plurality of keys of the computer keyboard is positioned within the openings to provide selective covering thereof to minimize inadvertent pressing of such keys in usage of the keyboard.

U.S. Pat. No. 5,934,813 appears to disclose a protective cover structure specifically designed to overlie and at least partially cover a keyboard of a computer which includes an overlying top portion having a nonplaner configuration. A front face of the cover structure has an open construction or configuration of sufficient dimension to allow the user's hands clear access to the keyboard for manipulation thereof during normal operation of the computer. The protective structure is at least partially formed from transparent material to allow viewing of the keyboard as well as the hands of the user when the subject assembly is in its protective, overlying position.

United States Patent Application Publication Number 2003/0002909 appears to disclose a shield for protecting a keyboard assembly which includes a one-piece resiliently flexible membrane having a generally planar base overlaying a deck portion of the keyboard assembly, and one or more raised bubbles formed in the membrane and configured to envelope an entire key array or separate or combined key clusters of the keyboard assembly. In a particularly preferred form, a raised bubble enveloping an alpha-numeric and format/command key cluster includes grooves configured to surround and form-fit only alphabetical, numeric, punctuation and symbol keys of the cluster.

While the above-identified patents and publication do appear to provide protective apparatuses and/or coverings for objects, their configurations remain non-desirous and/or problematic inasmuch as, among other things, none of the above-identified apparatuses appear to disclose an elastomeric protective film for releasable association with an object—among other things. Furthermore, none of the above-identified apparatuses appear to incorporate anti-microbial, anti-bacterial, and/or anti-viral compounds, preserve tactile sensation of the underlying object, provide visual indicators of time in use, and/or are provided to adhere to substantially vertical surfaces.

It is therefore an object of the present invention to provide a protective film, which, among other things, remedies the aforementioned detriments and/or complications associated with the use of the above-identified, conventional protective apparatuses and/or coverings.

These and other objects of the present invention will become apparent in light of the present specification and drawings.

SUMMARY OF THE INVENTION

The present invention is directed to, in one embodiment, a protective film comprising: at least one surface which serves as a protective barrier that releaseably covers at least a portion of an object.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be further understood that the invention is not necessarily limited to the particular embodiments illustrated herein.

The invention will now be described with reference to the drawings wherein.

DETAILED DESCRIPTION OF THE INVENTION

Figure 1:
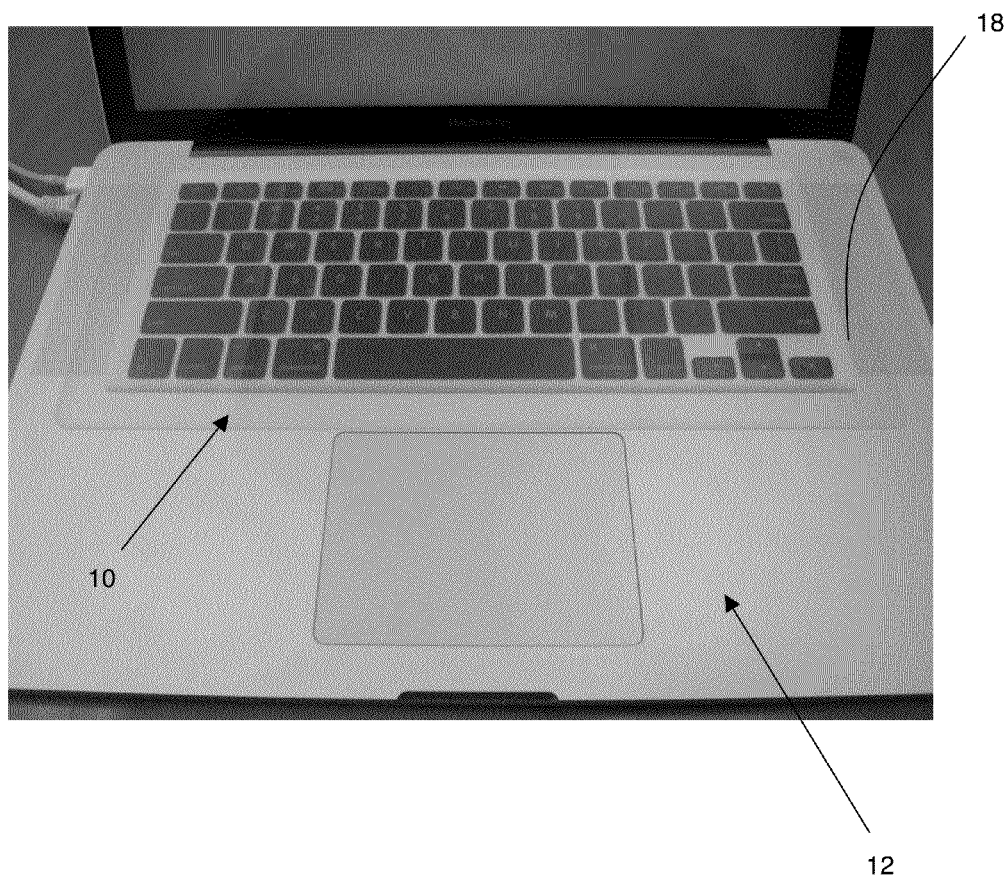
FIG. 1 of the drawings is a perspective view of a protective film overlaying a keyboard of a computer.

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters.

Figure 2:
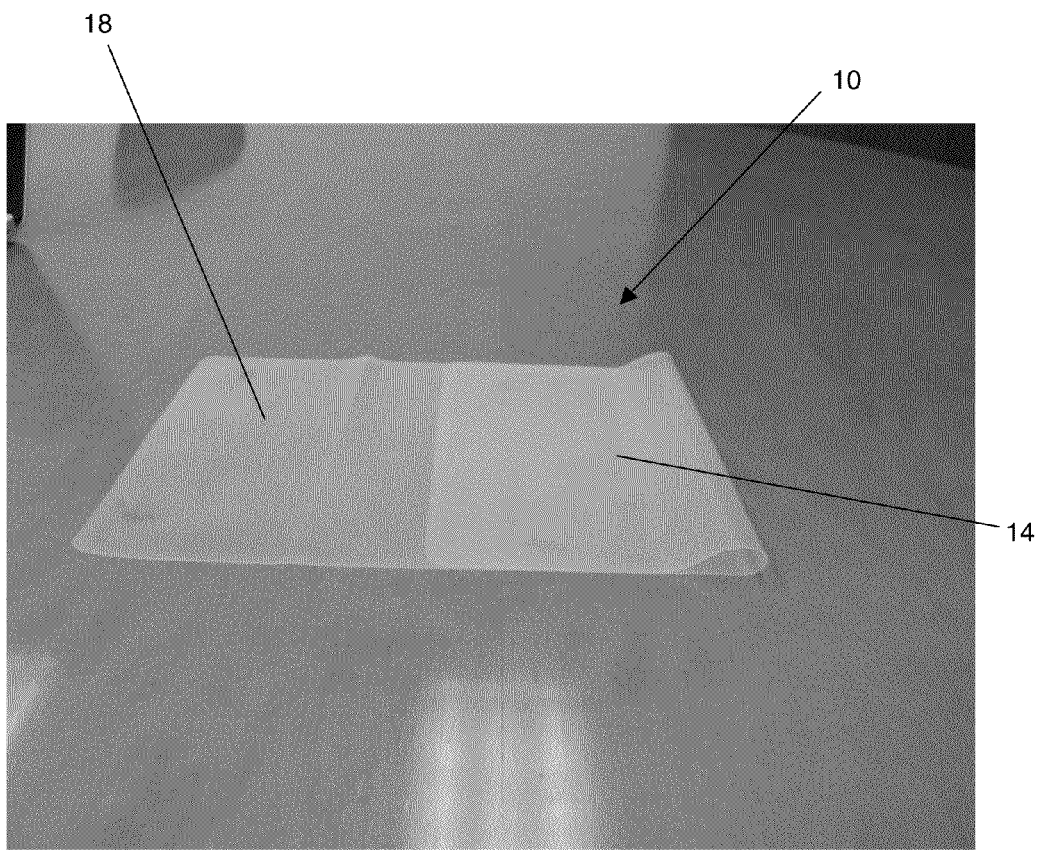
FIG. 2 of the drawings is a perspective view of the protective film of FIG. 1, showing both first and second surfaces thereof.
Figure 3:
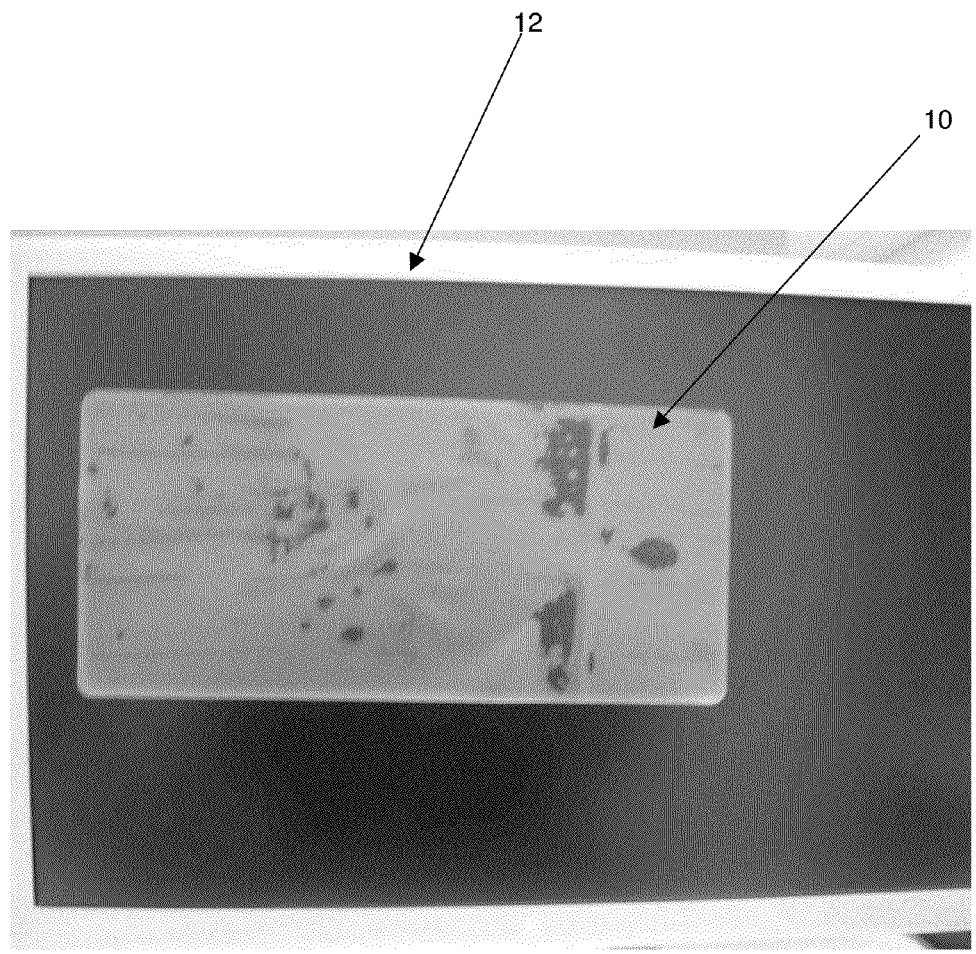
FIG. 3 of the drawings is a perspective view of the protective film of FIGS. 1-2 overlaying a substantially vertically oriented object.
Figure 4:
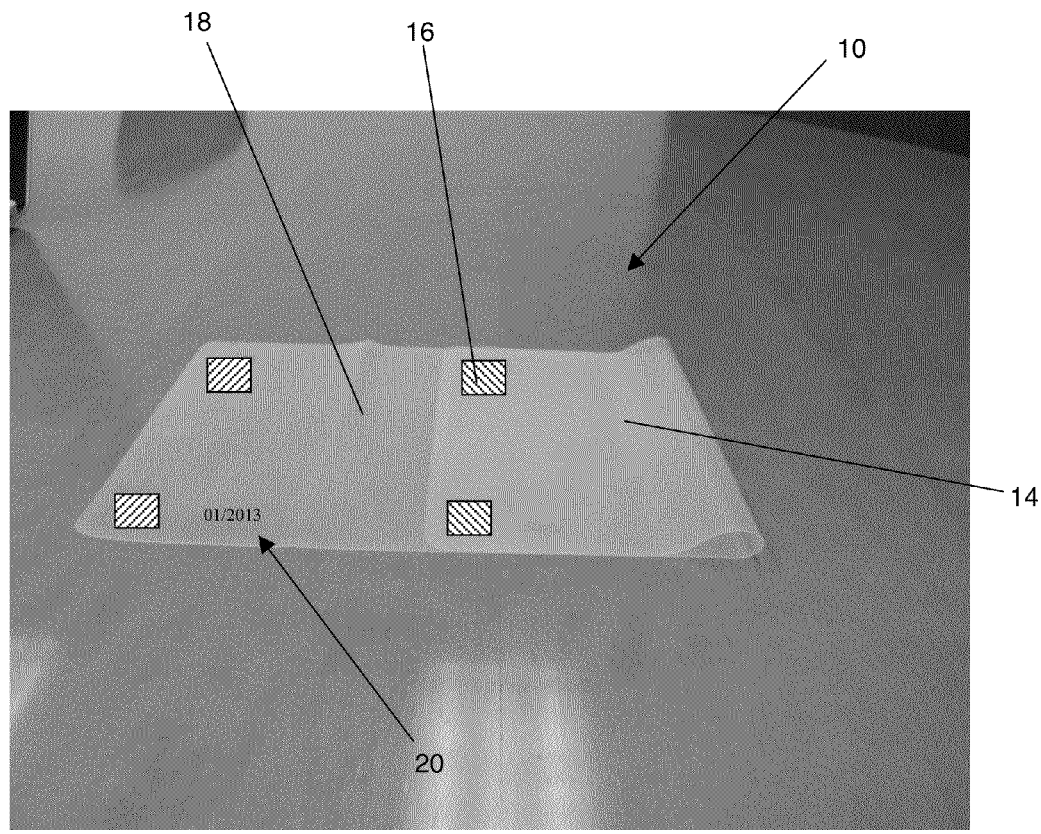
FIG. 4 of the drawings is a perspective view of a protective film for overlaying an object, the protective film having a plurality of adhesive strips and indicia.

Referring now to the collective drawings (i.e., FIGS. 1-4), shown therein is a protective film, hereinafter referred to as film 10. Film 10 is a protective barrier that releaseably covers at least a portion of object 12 such as a keyboard, display, touch screen device, kiosk display, and the like, to prevent direct contact with object 12 so as to reduce and/or substantially eliminate contamination of both object 12 and/or the user. Non-limiting examples of uses for film 10 include covering substantially horizontally oriented objects such as keyboards and/or substantially vertically oriented objects such as keyboards, touch screen displays, monitors, and the like.

In one embodiment, film 10 is a substrate fabricated from an at least partially transparent elastomeric material including natural and/or synthetic plastics and/or rubbers, saturated and/or unsaturated rubbers such as polyisoprene, butyl rubber, polyacrylic rubber, silicone, flurosilicone, and the like. Film 10 is preferably a thin material wherein tactile properties of the underlying object 12 remain sensible to the user, for example keyboards or other objects bearing tactile features such as Braille.

Film 10 comprises a first surface 14 that at least partially comprises a pressure, temperature, static, or otherwise adhesive type coating that allows film 10 to be self-adhering and releaseably associated with object 12. In one embodiment, the coating allows film 10 to be removed from object 12 without leaving a residue, such as adhesive and/or dirt residue.

In one embodiment, rather than being releaseably attachable to object 12 via a coating applied to first surface 14, film 10 may also be releaseably associated with object 12 via one or more adhesive strips 16 (see FIG. 4) disposed around the peripheral edge of film 10. Adhesive strips 16 may be permanently attached or incorporated into first surface 14. Adhesive strips 16 may be covered with a substrate that is removed before installation to prevent fouling of adhesive strips 16 with debris.

Second surface 18 of film 10 preferably comprises a non-stick coating or finish ensuring that film 10 can be installed in only one orientation and cannot be reversed to prevent contamination of object 12. Furthermore, second surface 18 may be at least partially covered with anti-microbial, anti-bacterial, anti-viral, and/or combinations thereof, coating or agents.

In accordance with the present invention, anti-microbial agents comprise chemical compositions that at least substantially inhibit microbial growth and/or kill bacteria, fungi and/or other microorganisms. A plurality of inorganic and/or organic chemical compositions which display anti-microbial activity are suitable for use with the present invention. Non-limiting examples of suitable organic substances that possess anti-microbial activity are carboxylic acids, alcohols and/or aldehydes, most of which appear to act by protein precipitation and/or by disruption of microbial cell membrane.

In one embodiment of the present invention, the anti-microbial activity of suitable inorganic substances is generally related to the ions, toxic to other microorganisms, into which they dissociate. The anti-microbial activity of various metal ions, for example, is often attributed to their affinity for protein material and the insolubility of the metal proteinate formed. Metal-containing salts are thus preferred among the inorganic substances that act as anti-microbial agents.

Metal inorganic salts, including simple salts of metal cations and inorganic anions like silver nitrate, are often soluble and dissociable and, hence, offer ready availability of potentially toxic ions.

Metal salts or complexes of organic moieties such as organic acids, on the other hand, are often less soluble and, therefore, are less dissociable than the soluble metal inorganic salts. Metal organic salts or complexes generally have a greater stability with respect to extraneous organic matter, and anions present in the environment of the living cell than metal inorganic salts, but have less toxic potential by virtue of their greater stability.

Silver ion is an example of a preferred metal ion which possess anti-microbial activity. To the best of Applicant's knowledge silver ions react with a variety of anions as well as with chemical moieties of proteins. Precipitation of proteins, causing disruption of the microbial cell membrane and complexation with DNA, is likely the basis of the anti-microbial activity. Silver ions in high concentration will form insoluble silver chloride and thereby deplete chloride ions in vivo.

Anti-bacterials are antiseptics that have the proven ability to act against bacteria. Non-limiting examples of anti-bacterials suitable for use in accordance with the present invention include alcohols such as ethanol (20-99$^+$%), 1-propanol (20-99$^+$%) and 2-propanol/isopropanol (20-99$^+$%) or mixtures of these alcohols. They are commonly referred to as "surgical alcohol". Used to disinfect the skin before injections are given, often along with iodine (tincture of iodine) or some cationic surfactants (benzalkonium chloride 0.05-0.5%, chlorhexidine 0.2-4.0% or octenidine dihydrochloride 0.1-2.0%). Other common anti-bacterials include quaternary ammonium compounds known as Quats or QAC's, include the chemicals benzalkonium chloride (BAC), cetyl trimethylammonium bromide (CTMB), cetylpyridinium chloride (Cetrim, CPC) and benzethonium chloride (BZT). Benzalkonium chloride is used in some pre-operative skin disinfectants (conc. 0.05-0.5%) and antiseptic towels. The anti-microbial activity of Quats is inactivated by anionic surfactants, such as soaps. Related disinfectants include chlorhexidine and octenidine.

It will be understood that film 10 may be single or double sidedly dip or spray coated with the anti-microbial, anti-bacterial, and/or anti-viral agent, or alternatively film 10 may also be impregnated with one or more of the aforementioned agents.

In one embodiment, film 10 may be constructed in such a way that film 10 is washable with soap and water or other cleansers so as to be reusable. Therefore, any coating or adhesive utilized in the fabrication of film 10 should be durable and impervious to washing with typical cleaning compounds.

In another embodiment, film 10 includes indicia 20 (see FIG. 4) indicative of for example, time in use, replacement date, and the like. It will be understood that indicia 20 aids in preventing overuse of film 10 which may lead to contamination.

Additionally, film 10 may include one or more visual indicators of use (not shown), for example, nanomaterials such as photonic crystals or polymer opal films which are disclosed in greater detail in U.S. Pat. No. 7,105,715, which is hereby incorporated by reference herein in its entirety including all references cited therein. These visual indicators of use may include color changing properties incorporated within film 10 to indicate whether film 10 should be cleaned and/or replaced. For example, film 10 may include a visual indicator that changes the color of film 10 from substantially transparent to any color such as red, green, blue, and the like.

The foregoing description merely explains and illustrates the invention and the invention is not limited thereto as those skilled in the art who have the disclosure before them will be able to make modifications without departing from the scope of the invention.

What is claimed and desired to be secured by Letters Patent of the United States is:

1. A protective film in combination with a vertically oriented object, consisting of:
   an outer surface and an inner surface, wherein the protective film releaseably covers at least a portion of the vertically oriented object,
   wherein the protective film is fabricated from an at least partially transparent elastomeric flurosilicone, and wherein the outer surface of the protective film is coated with a composition consisting of a carboxylic acid, an alcohol, an aldehyde, chlorhexidine, octenidine, and a polymer opal film.

2. A protective film in combination with a vertically oriented object, consisting of:
an outer surface and an inner surface, wherein the protective film releaseably covers at least a portion of the vertically oriented object,
wherein the protective film is fabricated from an at least partially transparent elastomeric material, and
wherein the outer surface of the protective film is coated with a composition consisting of a carboxylic acid, an alcohol, an aldehyde, chlorhexidine, octenidine, and a polymer opal film.

3. A protective film in combination with an object, consisting of:
an outer surface and an inner surface, wherein the protective film releaseably covers at least a portion of the object,
wherein the protective film is fabricated from an elastomeric material, and
wherein the outer surface of the protective film is coated with a composition consisting of chlorhexidine and a polymer opal film.

* * * * *